B. N. SHELLEY.
Carriage-Axle and Axle-Box.
No. 217,492.  Patented July 15, 1879.
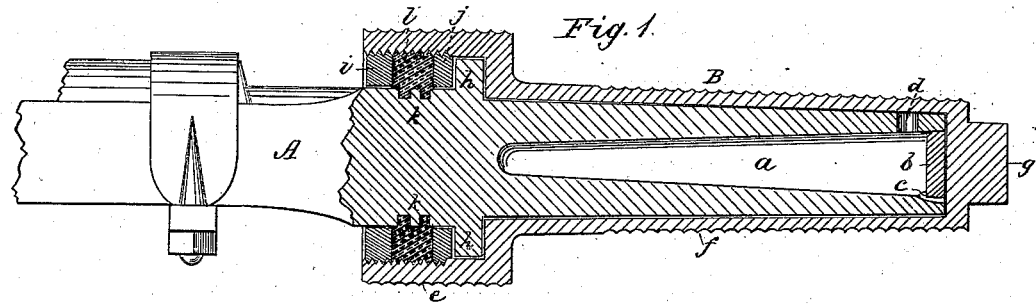
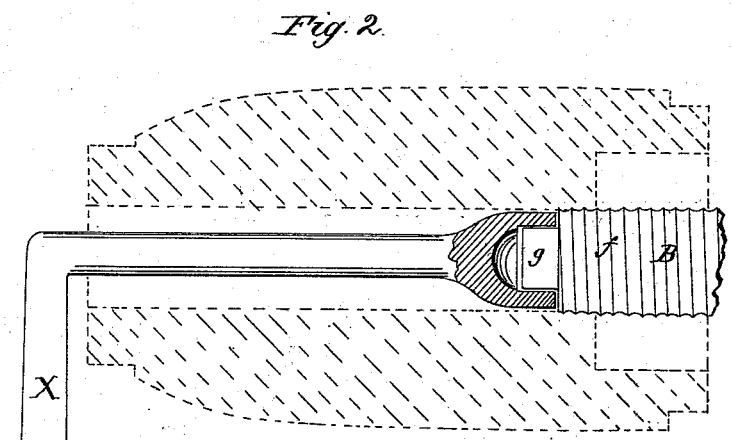
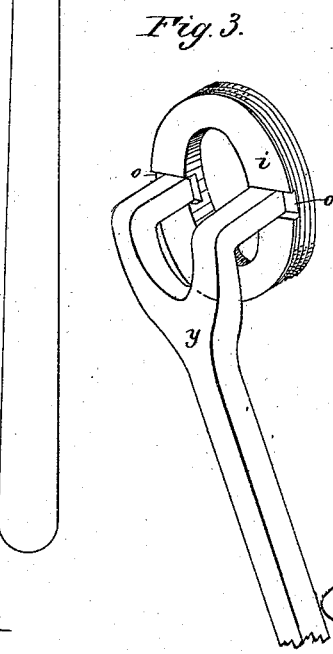
WITNESSES:
W. W. Hollingsworth
Edw. W. Byrn.
INVENTOR:
B. N. Shelley
BY
ATTORNEYS.

UNITED STATES PATENT OFFICE

BENJAMIN N. SHELLEY, OF ANDERSON, INDIANA.

IMPROVEMENT IN CARRIAGE-AXLE AND AXLE-BOX.

Specification forming part of Letters Patent No. 217,492, dated July 15, 1879; application filed December 10, 1878.

*To all whom it may concern:*

Be it known that I, BENJAMIN N. SHELLEY, of Anderson, in the county of Madison and State of Indiana, have invented a new and Improved Combined Carriage-Axle Journal and Box; and I do hereby declare that the following is a full, clear, and exact description of the same, reference being had to the accompanying drawings, forming part of this specification, in which—

Figure 1 is a longitudinal section of the axle journal and box. Fig. 2 is a view showing the application of the wrench to the journal-box for the screwing of the latter into the hub. Fig. 3 is a view showing the application of another form of wrench for screwing up the nuts or washers which hold the box to the journal.

My invention relates to certain improvements in the construction and arrangement with respect to each other of a carriage-axle journal and box, which improvements are partly applicable to other rotary bearings.

It consists, mainly, in combining a shaft having one or more grooves around it with a packing and two clamping nuts or washers arranged upon opposite sides of said packing, so that when said washers or nuts are drawn together they force the packing down into the groove in the shaft and form a flange or collar fitting in said groove, that both prevents the escape of oil and serves to hold the shaft and bearing against longitudinal movement.

The invention also consists in forming the axle-box with an external screw-thread of peculiar shape and a squared or angular projection on its end, adapted to receive a wrench, whereby the box may be turned into the hub without having a thread cut to receive it, all as hereinafter more fully described.

In the drawings, A represents the axle, which is rounded into a journal at its end, which journal is made with a central tapering chamber, $a$, extending the full length of the journal, and adapted to contain oil for lubricating the same. This chamber is made tapering and smallest toward the vehicle, in order to give the necessary increased strength at this point. The outer end of this chamber is for the most part closed by a removable metal plug, $b$, fitting snugly therein. A slight opening, $c$, however, in the nature of a groove or nick in the inner edge of the journal, is left, through which the oil constantly oozes to lubricate the bearing. This opening is made in the lowest part of the side of the journal, in order to insure the passage of the oil at all levels of the same in the oil-chamber, in contradistinction to placing it in the plug, where, by reason of the movable character of the plug, it might be turned to a position near the top, where the oil could not run through the same.

For charging the chamber with oil a hole, $d$, is left in the top of the journal near the end, which hole is made large enough to permit the ready insertion of the oil and to determine when the chamber is full.

B is the axle-box. This is made of two diameters, $e$ and $f$, the smallest of which, $f$, is entirely closed at its end and terminated by an angular projection, $g$, adapted to receive a wrench. The outer circumference of both portions of the box is provided with a screw-thread of the same pitch, which, in connection with the projection $g$, adapts the box to be screwed into its wooden hub and there securely held. This screw-thread is made of the peculiar form shown—that is to say, the spaces between the threads are very wide, and are in the nature of shallow and curved bottomed grooves, alternating with threads of a sharp apex and very little altitude. This form of thread I find binds and draws itself into the wood without having a screw-thread to receive it, while the ordinary V-shaped thread only cuts and grinds up the wood without drawing itself in.

In turning the box into the wooden hub a right-angular wrench, X, Fig. 2, is passed through the hub and fitted to the angular projection on the box, and a strong purchase thus afforded for turning in the box without scarring the other end of the same.

For holding the wheel and its box on the journal the latter is provided with a rigid collar, $h$, and two externally-threaded nuts or washers, $ij$, encompass the axle just back of said collar. The inner circumference of the larger part, $e$, of the box is also screw-threaded, and into the same the thread of the washers $i$ and $j$ meshes, so that when said washers are screwed up they turn with the box, and the collar $h$, resting between the same and the shoulder in the box, prevents the wheel from moving longitudinally on the journal.

Upon the rounded part of the axle, back of the collar, are formed one or two grooves, k, which occupy an intermediate position between the nuts i j when the latter are screwed up. Between these nuts is arranged a packing, l, of cotton or other suitable material, which, when clamped between the nuts, is forced down into the groove k and closes the joint between the box and the journal against the escape of oil.

By using a substantial packing and tightly compressing the same between these nuts the collar h on the journal may be dispensed with, as the pressure on the packing forces the same down into the grooves k of the axle, and said packing then turns in the said groove like a flange, so that it of itself will in some cases afford a sufficient resistance to the coming off of the wheel.

This principle of holding a journal and its box together by forcing the packing into a groove in the journal by compression between two screw-nuts is capable of a much wider application than that herein mentioned; and I may, therefore, employ it for holding a revolving shaft in a box or revolving box in a shaft for any purpose whatever.

By extending the journal end so that it bears against the inner end of the box, I reduce by this abutment the wear that would ordinarily come on the collar or the packing.

In screwing the nuts i and j to their places I form them with seats o, Fig. 3, and employ a specially-constructed wrench or spanner, y, having forked ends and right-angular lugs at their extremities.

With respect to the construction of the axle-box I am aware that this has been provided upon its outer surface with a screw-thread adapted to be turned into another screw-thread in the hub, and I therefore limit this feature of my invention to the axle-box provided with the peculiar form of thread shown, which enables it to draw itself into the hub without having a thread cut in the wood to receive it, and when provided with the terminal projection g, which permits of the application of a wrench to turn in the box, which projection allows a strong purchase to be obtained without mutilating the box, and which strong purchase is necessarily required for turning the box into the unthreaded wood.

Having thus described my invention, what I claim as new is—

1. A shaft or journal having one or more grooves around the same, in combination with a packing fitted in the plane of said grooves and two clamping nuts or washers placed one upon each side of said packing and adapted to be drawn together to force the packing into said groove, substantially as described.

2. The axle or shaft having grooves k, the externally-threaded nuts i j, the intermediate packing, and the internally-threaded box, all combined, substantially as shown and described.

3. An axle-box having an angular projection or wrench-hold, g, at its end and a screw-thread upon its external surface, of low sharp apices, alternating with wide curved bottomed grooves, substantially as described, and for the purposes set forth.

BENJAMIN N. SHELLEY.

Witnesses:
EDWD. W. BYRN,
SOLON C. KEMON.